US010038209B2

(12) United States Patent
Yamauchi et al.

(10) Patent No.: US 10,038,209 B2
(45) Date of Patent: Jul. 31, 2018

(54) CELL STACK DEVICE, MODULE, AND MODULE HOUSING DEVICE

(71) Applicant: KYOCERA Corporation, Kyoto-shi, Kyoto (JP)

(72) Inventors: Kyosuke Yamauchi, Kirishima (JP); Tatsuhiro Mure, Kirishima (JP); Shinpei Shiraishi, Kirishima (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/039,632

(22) PCT Filed: Nov. 27, 2014

(86) PCT No.: PCT/JP2014/081402
§ 371 (c)(1),
(2) Date: May 26, 2016

(87) PCT Pub. No.: WO2015/080207
PCT Pub. Date: Jun. 4, 2015

(65) Prior Publication Data
US 2017/0033394 A1    Feb. 2, 2017

(30) Foreign Application Priority Data

Nov. 28, 2013  (JP) ................... 2013-246253
Feb. 26, 2014  (JP) ................... 2014-035512

(51) Int. Cl.
*H01M 8/02*  (2016.01)
*H01M 8/2425*  (2016.01)
(Continued)

(52) U.S. Cl.
CPC ....... *H01M 8/2425* (2013.01); *H01M 8/1231* (2016.02); *H01M 8/247* (2013.01);
(Continued)

(58) Field of Classification Search
CPC ............ H01M 8/2485; H01M 8/1231; H01M 8/2457; H01M 2008/1293
See application file for complete search history.

(56) References Cited

U.S. PATENT DOCUMENTS

2002/0024185 A1*  2/2002  Ghosh ..................... C04B 30/02
                                              277/650
2005/0004716 A1*  1/2005  Lillis ..................... H01M 8/184
                                              700/287
(Continued)

FOREIGN PATENT DOCUMENTS

JP  2005019240 A   1/2005
JP  2007-59377 A   3/2007
(Continued)

OTHER PUBLICATIONS

International Search Report (Form PCT/ISA/210) dated Feb. 3, 2015 and issued for PCT Application No. PCT/JP2014/081402.
(Continued)

*Primary Examiner* — Cynthia K Walls
(74) *Attorney, Agent, or Firm* — Viering, Jentschura & Partner mbB

(57) ABSTRACT

A cell stack device is provided with a cell stack comprising a plurality of cells, a manifold fixing an end of each cell of the plurality of cells thereto with a sealing material, and configured to allow a reaction gas to be supplied to each cell. An electrically conductive end member is disposed at an end portion of the cell stack in an arrangement direction of the cells, and suppressing deformation of each cell, such that a first end of the electrically conductive end member at a side of the manifold is separated from the manifold.

20 Claims, 6 Drawing Sheets

(51) Int. Cl.
*H01M 8/2483* (2016.01)
*H01M 8/247* (2016.01)
*H01M 8/2485* (2016.01)
*H01M 8/1231* (2016.01)
*H01M 8/2428* (2016.01)
*H01M 8/2457* (2016.01)
*H01M 8/124* (2016.01)
*H01M 8/2475* (2016.01)

(52) U.S. Cl.
CPC ....... *H01M 8/2428* (2016.02); *H01M 8/2457* (2016.02); *H01M 8/2483* (2016.02); *H01M 8/2485* (2013.01); *H01M 8/2475* (2013.01); *H01M 2008/1293* (2013.01)

(56) References Cited

U.S. PATENT DOCUMENTS

| | | | | |
|---|---|---|---|---|
| 2005/0164067 | A1* | 7/2005 | Ooshima | H01M 8/0273 429/433 |
| 2007/0259235 | A1* | 11/2007 | Jacobson | B01D 53/22 429/458 |
| 2009/0042076 | A1* | 2/2009 | Demin | H01M 8/0254 429/425 |
| 2010/0006318 | A1* | 1/2010 | Elie | H01B 3/105 174/105 R |
| 2011/0195334 | A1* | 8/2011 | Crumm | H01M 8/0206 429/479 |
| 2014/0004439 | A1* | 1/2014 | Ohmori | H01M 8/0282 429/458 |

FOREIGN PATENT DOCUMENTS

| | | | |
|---|---|---|---|
| JP | 2007317612 A | 12/2007 | |
| JP | 2010108688 A | 5/2010 | |
| JP | 5116185 B1 * | 1/2013 | ......... H01M 8/0282 |
| JP | 2014-194065 A | 10/2014 | |

OTHER PUBLICATIONS

The Extended European Search Report based on Application No. 14866505.2 (8 Pages) dated May 17, 2017 (Reference Purpose Only).

* cited by examiner

CELL STACK DEVICE, MODULE, AND MODULE HOUSING DEVICE

TECHNICAL FIELD

The present invention relates to a cell stack device, a module, and a module-containing device.

BACKGROUND ART

In recent years, various technologies have been proposed as next generation energy sources including: fuel cell modules that include a fuel cell stack device constituted by a plurality of fuel cells being arranged in a housing, the fuel cells being a type of cell capable of generating power using a fuel gas (hydrogen-containing gas) and an oxygen-containing gas (air); and fuel cell devices that include fuel cell modules in an exterior casing (e.g. Patent Document 1).

Additionally, technologies have been proposed such as: electrolytic modules that include an electrolysis cell stack device housed in a housing, the electrolysis cell stack device being constituted by a plurality of electrolysis cells, which produce hydrogen and oxygen ($O_2$) by electrolyzing water vapor (water) via provision of water vapor and voltage, being arranged; and electrolysis devices that include electrolytic modules in an exterior casing (e.g. Patent Document 2).

CITATION LIST

Patent Literature

Patent Document 1: Japanese Unexamined Patent Application Publication No. 2007-59377A Patent Document 2: Japanese Unexamined Patent Application Publication No. 2014-194065A

SUMMARY OF INVENTION

Technical Problem

Fuel gas is supplied to each fuel cell in a fuel cell stack device, and water vapor is supplied to each electrolysis cell in an electrolysis device. These fuel cells or electrolysis cells are fixed, via a sealing material, to a manifold configured to allow fuel gas or water vapor to be supplied to the fuel cell or the electrolysis cell. However, there is a problem in that cracking and the like occurs in the sealing material, and this cracking leads to gas leaks.

In light of this, an object of the present invention is to provide a cell stack device whereby cracking of the sealing material can be suppressed and having improved long-term reliability, a module provided with the same, and a module housing device.

Solution to Problem

A cell stack device according to the present invention is provided with: a cell stack comprising a plurality of cells; a manifold fixing an end of each cell of the plurality of cells thereto with a sealing material, and configured to allow a reaction gas to be supplied to the each cell; and an electrically conductive end member disposed at an end portion of the cell stack in an arrangement direction of the cells, and suppressing deformation of the each cell, wherein a first end of the electrically conductive end member at a side of the manifold is separated from the manifold.

A cell stack device according to the present invention is provided with: a cell stack comprising a plurality of cells; a first manifold fixing a first end of each cell of the plurality of cells thereto with a sealing material, and configured to allow a gas to be supplied to the cells; a second manifold fixing a second end of the each cell thereto with a sealing material, and configured to allow a gas expelled from the each cell to be recovered; and an electrically conductive end member disposed at an end portion of the cell stack in an arrangement direction of the cells, and suppressing deformation of the each cell, wherein a first end of the electrically conductive end member at a side of the first manifold is separated from the first manifold, a second end of the electrically conductive end member at a side of the second manifold is separated from the second manifold, or the first end and the second end are separated from the first manifold and the second manifold.

A module of the present invention is a module wherein the cell stack device described above is housed in a housing.

Furthermore, a module-containing device according to the present invention is provided with the module described above and an auxiliary device configured to operate the module housed in an external casing.

Advantageous Effects of Invention

With the cell stack device of the present invention, the first end of the electrically conductive end member at the side of the manifold, disposed at the end portion in the arrangement direction of the cells is separated from the manifold. Therefore, a cell stack device whereby cracking of the sealing material can be suppressed and thus improved long-term reliability can be obtained.

With the cell stack device of the present invention, the first end of the electrically conductive end member at the side of the first manifold is separated from the first manifold, the second end of the electrically conductive end member at the side of on the second manifold is separated from the second manifold, or the first end and the second end are separated from the first and the second manifolds. Therefore, a cell stack device whereby cracking of the sealing material can be suppressed and thus improved long-term reliability can be obtained.

With the module of the present invention, the cell stack device described above is housed in a housing. Therefore, a module with improved long-term reliability can be obtained.

With the module-containing device of the present invention, the module described above and an auxiliary device configured to operate the fuel cell module are housed in an external casing. Therefore, a module-containing device with improved long-term reliability can be obtained.

BRIEF DESCRIPTION OF DRAWINGS

FIG. 3A is a side view and FIG. 3B is a front view.

FIG. 5A is a side view and FIG. 5B is a front view.

FIG. 9A is a side view and FIG. 9B is a front view.

DESCRIPTION OF EMBODIMENTS

A cell stack device, a module and a module-containing device will be described using FIGS. 1 to 12. Note that herein, "cell" shall be construed to include the meanings of "fuel cell" and "electrolysis cell". Additionally, "cell stack device" shall be construed to include the meanings of "fuel cell stack device" and "electrolysis cell stack device". Furthermore, "module" shall be construed to include the meanings of "fuel cell module" and "electrolytic module". Moreover, "module-containing device" shall be construed to include the meanings of "fuel cell device" and "electrolysis device".

Figure 1:
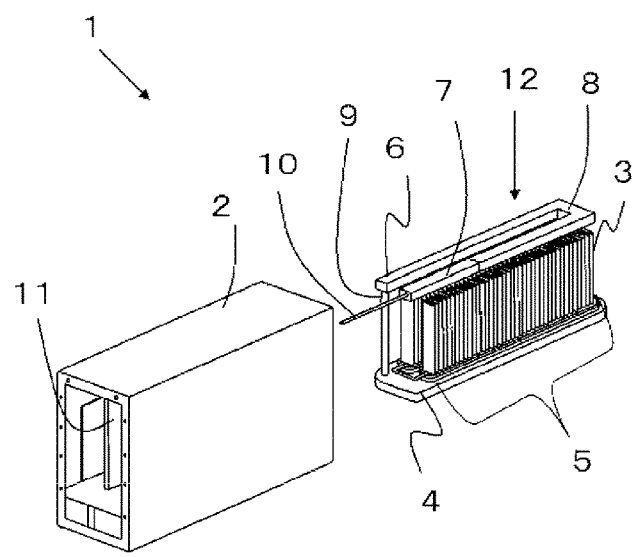
FIG. 1 is an exterior perspective view illustrating a fuel cell module provided with a first example of a fuel cell stack device formed using fuel cells of the present embodiment.
Figure 2:
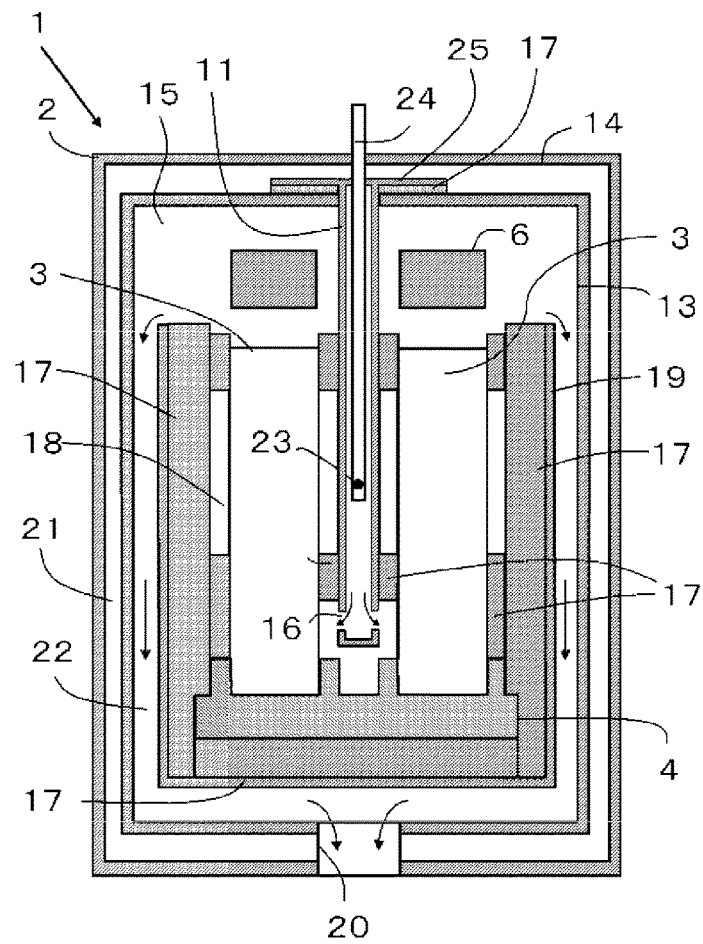
FIG. 2 is a cross-sectional view of the fuel cell module illustrated in FIG. 1.

FIG. 1 is an exterior perspective view illustrating a first example of a fuel cell module formed using fuel cells of the present embodiment. FIG. 2 is a cross-sectional view of FIG. 1. Note that in the subsequent drawings, the same reference numerals are used for the same components.

The fuel cell module 1 illustrated in FIG. 1 includes a fuel cell stack device 12 provided with two cell stacks 5 housed in a housing 2. In each of the cell stacks 5, fuel cells 3 are arranged uprightly in a row, each including a gas-flow passage (not illustrated) through which fuel gas flows from one end of the cell to the other end; the fuel cells 3 adjacent to each other are electrically connected in series via electrically conductive members (not illustrated in FIG. 1); and a lower end of each of the fuel cells 3 is fixed to a manifold 4 by an electrically insulative bonding material (not illustrated) such as a glass sealing material.

A reformer 6 for generating fuel gas to be supplied to the fuel cells 3 is disposed above the cell stacks 5. At the end portions of each of the cell stacks 5, there is disposed an electrically conductive end member that includes an electrically conductive unit for collecting electricity generated by the power generation in the cell stack 5 (the fuel cells 3) and drawing the electricity out of the cell stack 5 (not illustrated).

Note that FIG. 1 illustrates an example in which the fuel cell stack device 12 includes two cell stacks 5. However, the number of cell stacks may be changed as appropriate and, for example, the fuel cell stack device 12 may include only one cell stack 5. Moreover, the fuel cell stack device 12 may also include the reformer 6.

As described hereinafter, the manifold 4 stores fuel gas to be supplied to the fuel cells 3. The manifold 4 includes a gas case having an opening formed in the top surface thereof and a frame into which the fuel cells 3 are fixed and that is fixed to the gas case.

Further, the examples of the fuel cells 3 illustrated in FIG. 1 are hollow flat plate-shaped fuel cells that each include a plurality of fuel gas paths that allow fuel gas to flow through the fuel cells in the lengthwise direction thereof. The fuel cells 3 are solid oxide fuel cells that each include an inner electrode layer, a solid electrolyte layer, and an outer electrode layer stacked in that order on a surface of a support body that includes the fuel gas path. The configuration of the fuel cells 3 will be described below.

Further, in the fuel cell device of the present embodiment, the fuel cells 3 may, for example, be flat plate shaped or cylindrical shaped. In addition, the shape of the housing 2 may also be changed as appropriate.

Moreover, the reformer 6 illustrated in FIG. 1 reforms a raw fuel such as natural gas or kerosene supplied via a raw fuel supply pipe 10 to produce a fuel gas. It is preferable that the reformer 6 be capable of performing steam reforming which has an efficient reforming reaction. The reformer 6 includes a vaporizing unit 7 that vaporizes water and a reforming unit 8 that has a reforming catalyst (not illustrated) for reforming the raw fuel into fuel gas disposed therein. Then, the fuel gas produced in the reformer 6 is supplied to the manifold 4 via a fuel gas leading-out pipe 9. The fuel gas is then supplied via the manifold 4 to the fuel gas paths formed inside the fuel cells 3.

Moreover, FIG. 1 illustrates the fuel cell stack device 12 housed in the housing 2, with the fuel cell stack device 12 removed rearward and a portion of the housing 2 (front and back surfaces) removed. Here, in the fuel cell module 1 illustrated in FIG. 1, the fuel cell stack device 12 can be slid into and housed in the housing 2.

Note that an oxygen-containing gas introduction member 11 is disposed in the interior of the housing 2, between the cell stacks 5 arranged side by side on the manifold 4, so that the oxygen-containing gas flows along the sides of the fuel cells 3, from a lower end portion toward an upper end portion.

As illustrated in FIG. 2, the housing 2 of the fuel cell module 1 has a two-layer structure that includes an inner wall 13 and an outer wall 14. The outer wall 14 forms the outer frame of the housing 2, and the inner wall 13 forms a power generation chamber 15 that houses the fuel cell stack device 12. Furthermore, in the housing 2, the space between the inner wall 13 and the outer wall 14 forms an oxygen-containing gas flow path 21 through which oxygen-containing gas flows toward the fuel cells 3.

Here, a flange portion 25 and an oxygen-containing gas inflow opening (not illustrated) for allowing the inflow of oxygen-containing gas into the upper end side are provided of the upper portion in the housing 2. Additionally, the oxygen-containing gas introduction member 11 is inserted from an upper portion of the housing 2, passes through the interior of the housing 2, penetrates the inner wall 13, and is fixed. The oxygen-containing gas introduction member 11 includes, on a lower side, an oxygen-containing gas outflow opening 16 through which the oxygen-containing gas flows toward a lower end portion of each of the fuel cells 3. Moreover, a thermal insulating member 17 is arranged between each flange 25 and the inner wall 13.

Note that while the oxygen-containing gas introduction member 11 is disposed so as to be positioned between the two cell stacks 5 arranged side by side in the interior of the housing 2 in FIG. 2, the location of the oxygen-containing gas introduction member 11 may be changed as appropriate depend on the number of the cell stacks 5. For example, when the housing 2 houses only one cell stack 5, two oxygen-containing gas introduction members 11 may be provided and disposed so as to sandwich the cell stack 5 from both side surface sides.

Moreover, the thermal insulating members 17 may also be formed inside the power generation chamber 15 as appropriate in order to maintain a high temperature inside the fuel cell module 1, which prevents a decrease in the temperature of the fuel cells 3 (cell stacks 5) and a decrease in power output that result from excessive radiation of heat from the inside of the fuel cell module 1.

It is preferable that the thermal insulating members 17 be arranged in the vicinity of the cell stacks 5. It is particularly preferable that the thermal insulating members 17 be arranged on the side surfaces of the cell stacks 5 extending in the direction in which the fuel cells 3 are arranged and that the thermal insulating members 17 have a width greater than or equal to the width of the side surfaces of the cell stacks 5 in the direction in which the fuel cells 3 are arranged. It is preferable that the thermal insulating members 17 be arranged on both side surface sides of the cell stacks 5. This makes it possible to effectively inhibit temperature decreases in the cell stacks 5. Furthermore, this makes it possible to inhibit oxygen-containing gas led in by the oxygen-containing gas introduction member 11 from being discharged from the side surface sides of the cell stacks 5, thereby making it possible to promote the flow of oxygen-containing gas between the fuel cells 3 of the cell stacks 5. Note that openings 18 are formed in the thermal insulating members 17 arranged on both side surface sides of the cell stacks 5 in order to regulate the flow of oxygen-containing gas to the fuel cells 3 and to decrease the differences in temperature in the lengthwise direction in which the cell stacks 5 extend as well as in the direction in which the fuel cells 3 are stacked.

Moreover, on the inner sides of the inner walls 13 extending in the direction in which the fuel cells 3 are arranged, exhaust gas inner walls 19 are formed. The space between the inner walls 13 and the exhaust gas inner walls 19 forms exhaust gas flow paths 22 that allow the exhaust gas inside the power generation chamber 15 to flow from top to bottom. Furthermore, the exhaust gas flow paths 22 are communicated to an exhaust hole 20 formed at the bottom of the housing 2. Further, the thermal insulating members 17 are provided on the cell stack 5 side of the exhaust gas inner walls 19 as well.

Accordingly, exhaust gases produced when the fuel cell module 1 operates (during a startup process, power generation, or a shutdown process) flow through the exhaust gas discharge paths 22 and then are discharged through the exhaust hole 20. Note that the exhaust hole 20 may be formed by cutting out a portion of the bottom of the housing 2 or by using a pipe-shaped member.

Note that, inside the oxygen-containing gas introduction member 11, a thermocouple 24 for measuring the temperature near the cell stacks 5 is disposed such that a temperature sensing portion 23 of the thermocouple 24 is positioned at the center of the fuel cells 3 in the lengthwise direction and at the center in the direction in which the fuel cells 3 are arranged.

Further, in the fuel cell module 1 configured as described above, the fuel gas and the oxygen-containing gas discharged from the fuel gas flow paths of the fuel cells 3 and not used in power generation are combusted between an upper end of the fuel cells 3 and the reformers 6, making it possible to increase and maintain the temperature of the fuel cells 3. In addition, this makes it possible to heat the reformers 6 disposed above each of the fuel cells 3 (cell stacks 5), and efficiently perform a reformation reaction in the reformers 6. Furthermore, during normal power generation, the fuel cell module 1 has a temperature of 500 to 1000° C. due to the abovementioned combustion process and the generation of power in the fuel cells 3.

Figure 3A:
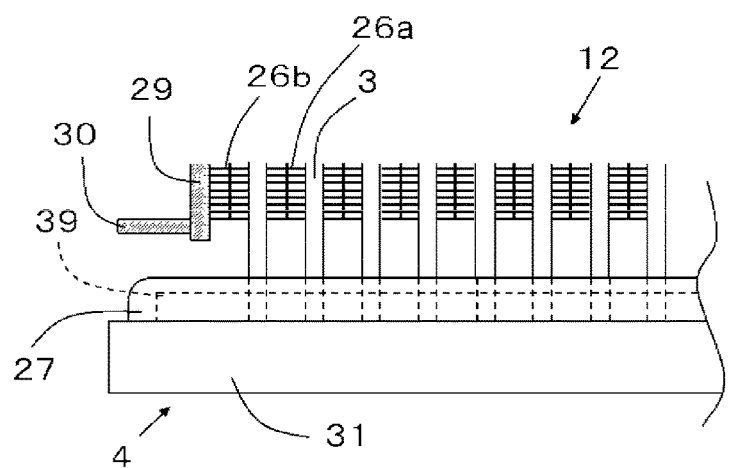
FIGS. 3A and 3B illustrate a part of the first example of the fuel cell stack device of the present embodiment.
Figure 3B:
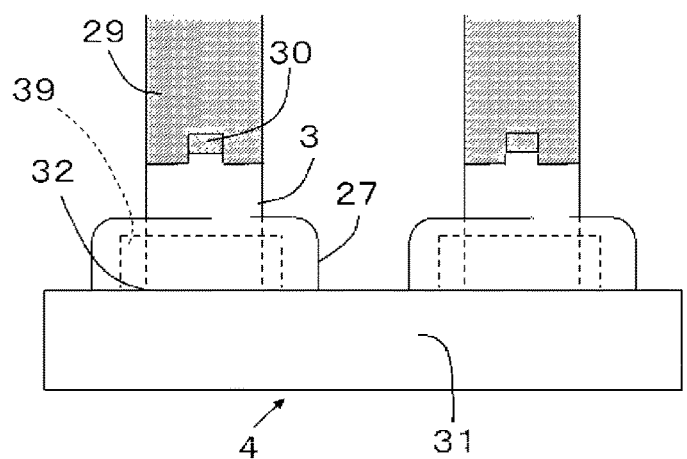
Figure 4:
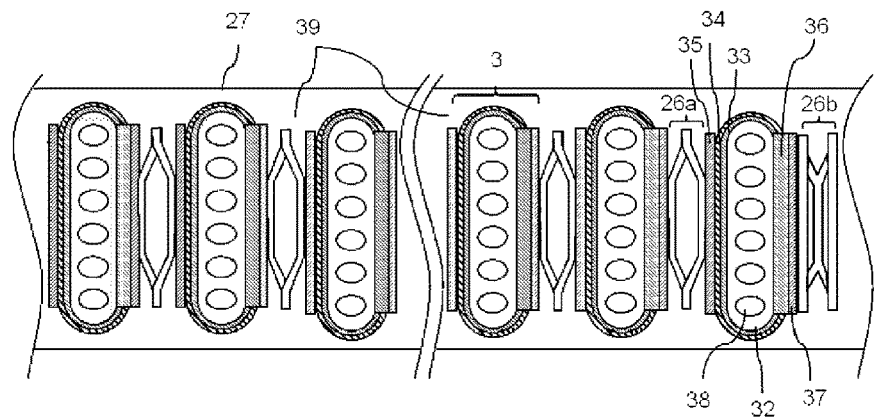
FIG. 4 is a cross-sectional view illustrating a part of the fuel cell stack device of the present embodiment illustrated in FIG. 1.

FIGS. 3A and 3B illustrate a part of the first example of the fuel cell stack device of the present embodiment. FIG. 3A is a side view and FIG. 3B is a front view. FIG. 4 is a cross-sectional view illustrating a part of the fuel cell stack device of the present embodiment.

As illustrated in FIGS. 3A, 3B and FIG. 4, the frame 27 encloses a first end portion of each of the fuel cells 3 (the lower end portions in FIGS. 3A and 3B), and the peripheries of the lower end portions of the fuel cells 3 are fixed using the sealing material 39 with which the inside of the frame 27 is filled. In other words, each cell stack 5 is bonded to the frame 27 using the sealing material 39 and houses the plurality of fuel cells 3 such that the fuel cells 3 are arranged in a line within the frame 27 and are connected via the electrically conductive members 26a. Note that the area within the frame 27 is the fixed portion. Additionally, preferably a material having thermal resistance and electrically insulating properties such as, for example, glass or the like, is used as the sealing material 39.

The electrically conductive end member 29 is disposed at an end portion of the cell stack 5 in the arrangement direction of the fuel cells 3, and suppresses deformation of the fuel cells 3. Here, "an end portion" may refer to both end portions, or either one of the end portions.

Additionally, the electrically conductive end member 29 is connected to the fuel cell 3 positioned outermost in the cell stack 5 via an electrically conductive member 26b disposed outward of this outermost cell 3.

As illustrated in FIGS. 3A and 3B, reference sign 26a designates the electrically conductive member interposed to electrically connect the fuel cell 3, and reference sign 26b designates the electrically conductive member positioned outward of the outermost cell 3 in the cell stack 5.

Additionally, in the example illustrated in FIGS. 3A and 3B, the shape of the electrically conductive end member 29 is a flat plate shape, and differs from the shape of the electrically conductive member 26b. As a result of this configuration, the electrically conductive end member 29 can draw out electrical current from the electrically conductive member 26b across a wide area.

Additionally, the electrically conductive end member 29 preferably is configured such that a first end (lower end) thereof is positioned below the lower end of the electrically conductive member 26b and a second end (upper end) thereof is positioned above the upper end of the electrically conductive member 26b. As a result of this configuration, the electrically conductive end member 29 will be connected to the electrically conductive member 26b across a wide contact area. Accordingly, the electrically conductive end member 29 can draw out electrical current from the electrically conductive member 26b across a wide area.

The electrically conductive end member 29 is electrically connected to the electrically conductive member 26b, and includes an electrically conductive portion 30 protruding outward from the cell stack 5. The end of the electrically conductive portion 30 is separated from the manifold 4.

While not illustrated in the drawings, a protective cover may be provided on the outer side of the electrically conductive end member 29 to protect the electrically conductive end member 29 and the cell stack 5 from external impacts and contact with thermal insulating material disposed around the cell stacks 5.

The gas case 31 of the manifold 4 includes, in the top surface thereof, openings 32 for supplying gas to the gas-flow passages of the fuel cells 3. A first end portion of the ring-shaped frame 27 is inserted into, and fixed using the sealing material 39, a groove formed in a ring shape so as to surround the openings 32 in the gas case 31, such that the cell stack 5 covers the openings 32. As a result, areas other than the gas-flow passages 38 of the fuel cells 3 will be hermetically sealed.

In this configuration, the first end portions of the fuel cells 3 are fixed to the frame 27 using the sealing material 39 as a separate step prior to connecting the cell stack 5 to the gas case 31. Therefore, the frame 27 can be fixed and sealed to the gas case 31 in a later step.

Hereinafter, the fuel cells 3 constituting the cell stack device 12 will be described.

As illustrated in FIG. 4, each fuel cell 3 is column-shaped (for example, hollow flat plate-shaped) and includes a column-shaped conductive supporting substrate 32 (hereinafter, sometimes abbreviated as "supporting substrate 32") that has a pair of flat surfaces facing one another and an inner electrode layer 33, a solid electrolyte layer 34, and an outer electrode layer 35 stacked in that order on one of the flat surfaces. Gas-flow passages 38 through which gas flows are provided in the conductive supporting substrate 32. FIG. 4 illustrates an example where six of these gas-flow passages 38 are provided. The example illustrated in FIG. 4 will be described with the inner electrode layer 33 as the fuel-side electrode layer and the outer electrode layer 35 as the air-side electrode layer.

Note that in the fuel cells 3 of the example illustrated in FIG. 4, the inner electrode layer 33 was described as the fuel-side electrode layer and the outer electrode layer 35 was described as the air-side electrode layer. However, the fuel cells 3 may have a configuration where the inner electrode layer 33 is the air-side electrode layer, the outer electrode layer 35 is the fuel-side electrode layer, and oxygen-containing gas flows through the gas-flow passages 38.

An interconnector 36 is formed on the other flat surface of the fuel cell 3, and a p-type semiconductor layer 37 is formed on the outer (upper) surface of the interconnector 36. The p-type semiconductor layer 37 connects the electrically conductive member 26a to the interconnector 36, forming an ohmic contact therebetween and thereby making it possible to reduce the voltage drop thereacross and to effectively avoid decreases in current collection performance. Additionally, in FIG. 4, the electrically conductive end member 29 is omitted. Furthermore, on a premise that the supporting substrate doubles as the fuel-side electrode layer, the fuel cell may be formed by the solid electrolyte layer and the air-side electrode layer being stacked on the surface of the supporting substrate.

A well-known conventional material may be used for the fuel-side electrode layer 33. For example, the fuel-side electrode layer 33 may be formed of $ZrO_2$ (referred to as a stabilized zirconia that also includes partially stabilized zirconia) containing a porous conductive ceramic such as a rare earth element in solid solution and Ni and/or NiO.

The solid electrolyte layer 34 must function as an electrolyte that allows electrons to move between the fuel-side electrode layer 33 and the air-side electrode layer 35 and as a gas barrier that prevents fuel gas and oxygen-containing gas leaks. The solid electrolyte layer 34 is formed of $ZrO_2$ containing 3 to 15 mol % of a rare earth element in solid solution. Note that the solid electrolyte layer 34 may be formed of another material as long as that material exhibits the abovementioned properties.

The material for the air-side electrode layer 35 is not particularly limited, and any well-known conventional material may be used. For example, the air-side electrode layer 35 may be formed of an electrically conductive ceramic made from a so-called $ABO_3$ perovskite oxide. The air-side electrode layer 35 must be gas permeable, and it is preferable that the open porosity of the air-side electrode layer 35 be greater than or equal to 20% and particularly in the range of 30 to 50%.

The supporting substrate 32 must be gas permeable to allow the fuel gas to permeate through to the fuel-side electrode layer 33 and must also be electrically conductive in order to allow current collection via the interconnector 36. Therefore, a material such as an electrically conductive ceramic or cermet may be used for the supporting substrate 32. For production of the cells 3, if the supporting substrate 32 is produced by simultaneous sintering with the fuel-side electrode layer 33 or the solid electrolyte layer 34, it is preferable that the supporting substrate 32 be formed of an iron group metal and a prescribed rare earth oxide. Moreover, in each of the fuel cells 3 illustrated in FIGS. 3A and 3B, the column-shaped (hollow flat plate-shaped) supporting substrate 32 has a long, thin plate shape that extends in the erecting direction and includes two flat surfaces and two semicircular side surfaces. Furthermore, to ensure gas permeability, it is preferable that the supporting substrate 32 have an open porosity of greater than or equal to 30% and particularly in the range of 35 to 50%. It is also preferable that the supporting substrate 32 have an electrical conductivity of greater than or equal to 300 S/cm and particularly greater than or equal to 440 S/cm. In addition, the supporting substrate 32 may also be cylinder-shaped as long as the overall columnar shape is retained.

Examples of the p-type semiconductor layer 37 may include a layer formed of a perovskite transition metal oxide, for example. More specifically, a material that has a higher electron conductivity than that of the material forming the interconnector 36 such as a p-type semiconductor ceramic formed of at least one of an $LaMnO_3$ oxide, an $LaFeO_3$ oxide, and an $LaCoO_3$ oxide having Mn, Fe, Co, or the like at the B site may be used, for example. It is generally preferable that the thickness of this p-type semiconductor layer 37 be in the range of 30 to 100 μm.

A material such as a lanthanum chromite perovskite oxide ($LaCrO_3$ oxide) or a lanthanum strontium titanium perovskite oxide ($LaSrTiO_3$ oxide) may be used for the interconnector 36, as described above. These materials are electrically conductive and are neither deoxidized nor oxidized upon coming into contact with the fuel gas (a hydrogen-containing gas) and an oxygen-containing gas (for example, air). Moreover, the interconnector 36 must be dense in order to prevent leaks of the fuel gas flowing through the gas paths 38 formed in the supporting substrate 32 as well as leaks of the oxygen-containing gas flowing outside the supporting substrate 32. Thus, it is preferable that the interconnector 36 have a relative density of greater than or equal to 93% and particularly greater than or equal to 95%.

Furthermore, the electrically conductive member 26a interposed to electrically connect the fuel cells 3, the electrically conductive member 26b positioned outermost in the cell stack, and the electrically conductive end member 29 may be formed of an elastic metal or alloy or of a metal fiber or alloy fiber felt to which the necessary surface treatments have been applied.

When operating or producing the cell stack device 12, cracking sometimes occurs in the sealing material 39 formed from glass or the like. In cases where, for example, the fuel cells 3, the electrically conductive member 26, the electrically conductive end member 29, and other members are fixed using the sealing material 39, this cracking is thought to be caused by the expansion of the members due to heat generated during operation or production. The expanding forces cause stress in the sealing material 39, which leads to cracking. Cracking is particularly prone to occur at the interfaces of the frame 27 and the fuel cells 3 with the sealing material 39.

Accordingly, in the cell stack device 12 of the present embodiment, as a means to suppress cracking of the sealing material 39, the first end (lower end) of the electrically conductive end member 29 at a side of the manifold 4 is separated from the manifold 4 to reduce the stress generated in the sealing material 39. In other words, the bottom end of the electrically conductive end member 29 is not fixed in the sealing material 39.

Therefore, the propagation of stress generated in the electrically conductive end member 29 to the sealing material 39 can be suppressed and, as a result, cracking of the sealing material 39 can be suppressed.

In the fuel cell stack device 12 illustrated in FIG. 3A, the end portions (lower end portions) of the electrically conductive members 26a and 26b at the side of the manifold 4 are also separated from the manifold 4. In this configuration, cracking of the sealing material 39 can be suppressed even more efficiently. However, these members may also be fixed to the sealing material 39 depending on the durability of the sealing material 39.

Figure 5A:
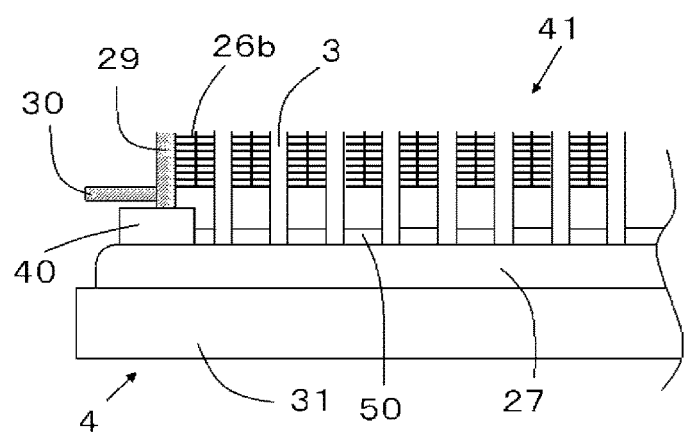
FIGS. 5A and 5B illustrate a part of a second example of the fuel cell stack device of the present embodiment.
Figure 5B:
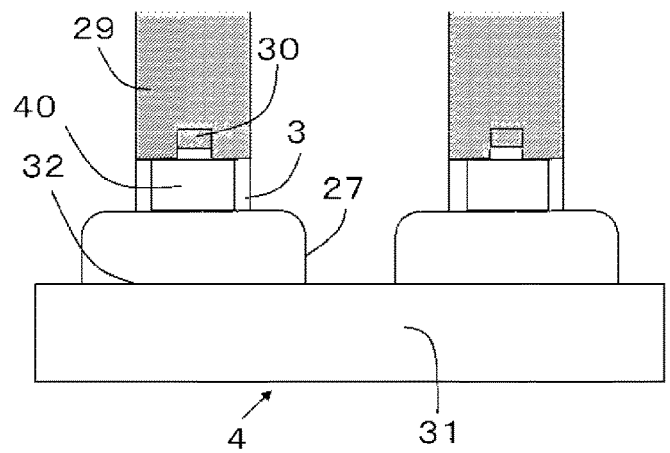

FIGS. 5A and 5B illustrate a part of a second example of the fuel cell stack device of the present embodiment. FIG. 5A is a side view and FIG. 5B is a front view.

In the fuel cell stack device 12 illustrated in FIG. 3A, the electrically conductive end member 29 is separated from the manifold 4 and the gap therebetween is depicted as empty space. However, in this case, the electrically conductive end member 29 and the electrically conductive member 26b may peel from each other due to the effects of the stress generated in the electrically conductive end member 29 at the site where the end conductive member 29 and the electrically conductive member 26b are joined.

Accordingly, in a fuel cell stack device 41 illustrated in FIGS. 5A and 5B, a holding member 40 composed of a material different from the sealing material 39 is provided between the manifold 4 and the first end of the electrically conductive end member 29 at the side of the manifold 4. The holding member 40 holds the first end (lower end) of the electrically conductive end member 29. More specifically, the holding member 40 is provided between the first end of the electrically conductive end member 29 at the side of the manifold 4 and the sealing material 39.

Thus, the holding member 40 will absorb part of the stress generated in the electrically conductive end member 29 and peeling of the electrically conductive end member 29 from the electrically conductive member 26b can be prevented.

Accordingly, the holding member 40 preferably has elasticity and is deformable; and includes a surface formed from an oxide.

For example, a flocculent thermal insulating material, a helical linear member fabricated using glass or the like, or a plate spring can be used as the holding member 40. Thus, the holding member 40 can absorb more of the stress generated in the electrically conductive end member 29 and also, the holding member 40 can be used stably over a long term, even in high temperature environments where components are prone to oxidization, because the surface of the holding member 40 is formed from an oxide. Note that while only the surface needs to be formed from an oxide, the entire holding member 40 may also be formed from an oxide.

Additionally, the electrically conductive end member 29 has the electrically conductive portion 30 protruding outward from the cell stack 5, and the electrically conductive portion 30 is preferably electrically conductive as it draws electrical current out of the cell stack 5. On the other hand, when the holding member 40 is provided and the frame 27 of the manifold 4 is electrically conductive, the holding member 40 preferably has electrically insulating properties because the device may short due to the holding member 40 coming into contact with the frame 27. Shorting caused by the electrically conductive end member 29 or the electrically conductive portion 30 coming into contact with the electrically conductive frame 27 can also be prevented by imparting the holding member 40 with electrically insulating properties.

As such, in this case, the holding member 40 is preferably fabricated using a material such as aluminum oxide, silicon oxide, zirconium oxide, or a composite oxide containing these oxides. Herein, "electrically conductive" refers to properties that pass electricity and "electrically insulating properties" refers to properties that do not pass electricity when the cell stack device is operating.

Additionally, as described above, cracking is also prone to occur at the interface between the sealing material 39 and the fuel cells 3. As such, a fixing member 50 including an oxide is preferably provided on the surface of the sealing material 39. The fixing member 50 fixes the first end portions of the fuel cells 3 to the sealing material 39. Additionally, this fixing member 50 can relax the stress between the fuel cells 3 and the sealing material 39. Note that the fixing member 50 is provided in the cell stack device 41 illustrated in FIGS. 5A and 5B. Thus, the fixing member 50 can relax the stress generated by expansion, deformation, or the like of the fuel cells 3, and cracking at the interface of the fuel cells 3 and the sealing material 39 can be suppressed.

Examples of materials used to fabricate the fixing member 50 include thermal insulating materials having aluminum oxide or silicon oxide as primary components. The reason for using an oxide as the primary component is the same that described above for the holding member.

Figure 6:
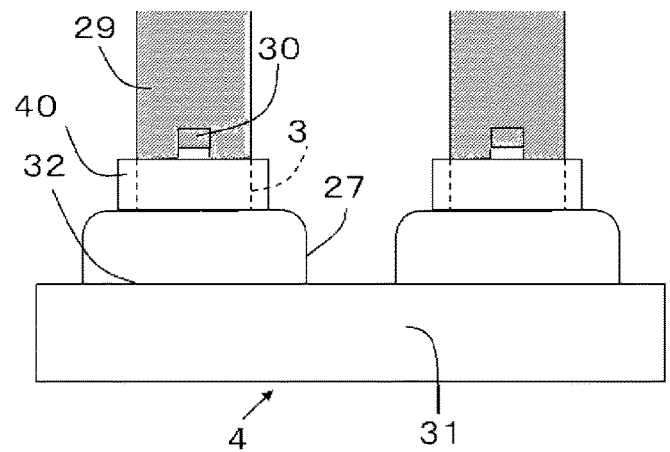
FIG. 6 is a front view illustrating a part of the second example of the fuel cell stack device of the present embodiment.

FIG. 6 is a front view illustrating a part of the second example of the fuel cell stack device of the present embodiment.

In the example illustrated in FIG. 6, the width of the holding member 40 is greater than the width of the electrically conductive end member 29. With this configuration, the holding member 40 can absorb a part of the stress generated in the electrically conductive end member 29 across a wider contact area. Accordingly, the electrically conductive end member 29 can be prevented from peeling from the electrically conductive member 26b.

Additionally, in the example illustrated in FIG. 6, the width of the holding member 40 is greater than the width of the electrically conductive end member 29 and the holding member 40 is interposed between the electrically conductive end member 29 and the frame 27 so as to be abutted against each. With this configuration, electrically conductive foreign objects can be prevented from being sandwiched between the electrically conductive end member 29 and the frame 27 and, therefore, shorting between the electrically conductive end member 29 and the frame 27 can be prevented.

Figure 7:
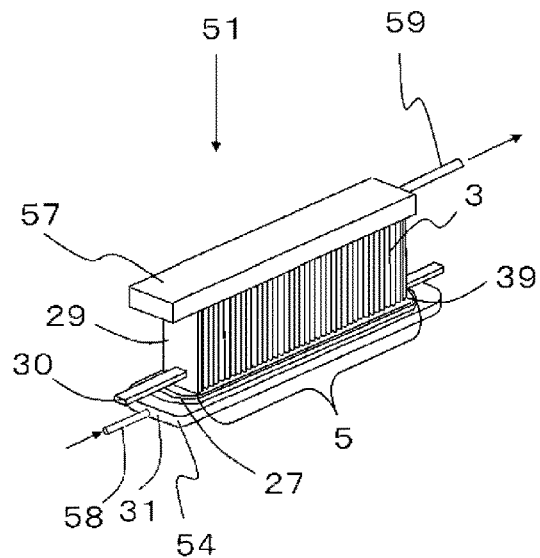
FIG. 7 is an exterior perspective view illustrating a first example of a cell stack device of the present embodiment.

FIG. 7 is an exterior perspective view illustrating an example of an electrolysis cell stack device of the present embodiment.

The electrolysis cell stack device 51 illustrated in FIG. 7 is provided with a cell stack 5 including electrolysis cells 3 arranged uprightly in a row, each including a gas-flow passage (not illustrated) through which fuel gas flows from one end of the cell to the other end. The electrolysis cells 3 adjacent to each other are electrically connected in series via inter-cell electrically conductive members (not illustrated in FIG. 7).

Each of the electrolysis cells 3 has a bottom end fixed to a first manifold 54 using a glass or similar sealing material 39 with electrically insulating properties, and a top end fixed to a second manifold 57 likewise using the sealing material. A water vapor supply pipe 58 for supplying water vapor is connected to the first manifold 54, and a hydrogen recovery pipe 59 for recovering hydrogen-containing gas is connected to the second manifold 57.

Additionally, in the electrolysis cell stack device 51 illustrated in FIG. 7, an electrically conductive end member 29 for allowing the flow of electrical current to the electrolysis cells 3 is provided on both ends of the cell stack 5 in the arrangement direction of the electrolysis cells 3. Additionally, the electrically conductive end member 29 is connected to the electrolysis cell 3 via the electrically conductive member 26*b*.

The electrically conductive end member 29 is disposed at an end portion of the cell stack 5 in the arrangement direction of the electrolysis cells 3, and suppresses deformation of the electrolysis cells 3. Here, "an end portion" may refer to both end portions, or either one of the end portions.

The electrically conductive end member 29 illustrated in FIG. 7 is provided, on the lower end side thereof, with an electrically conductive portion 30 protruding outward from the cell stack 5. The end of the electrically conductive portion 30 is separated from the first manifold 54 and the second manifold 57. A protective cover may be provided on the outer side of the electrically conductive end member 29 as a part thereof to protect the electrically conductive end member 29 and the cell stack 3 from external impacts and contact with thermal insulating material disposed around the cell stack 3.

Note that FIG. 7 illustrates an example in which one cell stack 5 is fixed in each manifold. However, the number of cell stacks 5 may be changed as appropriate and, for example, each manifold may include a plurality of cell stacks 5.

In the electrolysis cell stack device 51 described above, hydrogen-containing gas can be produced by applying voltage to water vapor-containing air flowing through the gas-flow passages; the first manifold 54 is a supply portion for supplying high-temperature water vapor; and the second manifold 57 is a recovery portion for recovering the produced hydrogen.

The first manifold 54 and the second manifold 57 described above are interchangeable.

Furthermore, each of the manifolds stores gas to be supplied to or recovered from the electrolysis cells 3. Each of the manifolds includes a gas case 31 having an opening formed in the top surface thereof and a frame 27 into which the electrolysis cells 3 are fixed and that is fixed to the gas case 31.

Figure 8A:
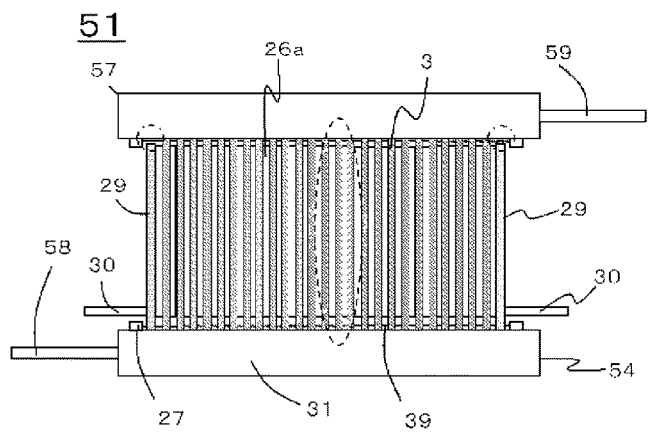
FIG. 8A is a cross-sectional view of the side surface side of the electrolysis cell stack device illustrated in FIG. 7.
Figure 8B:
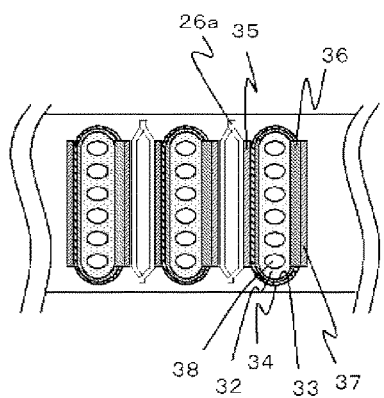
FIG. 8B is a cross-sectional view of the area marked by the dashed line illustrated in FIG. 8A.

FIG. 8A is a cross-sectional view of the side surface side of the electrolysis cell stack device illustrated in FIG. 7. FIG. 8B is a cross-sectional view of the area marked by the dashed line illustrated in FIG. 8A. First, the electrolysis cells 3 will be described using FIG. 8B. Note that in the cross-sectional view of the side surface side of FIG. 8A, a portion of the hatching has been omitted and the electrically conductive end member 29 has been filled with dots to distinguish it from other components.

The electrolysis cells 3 illustrated in FIGS. 8A and 8B have the configuration as the fuel cells 3 illustrated in FIGS. 1 to 5B.

Furthermore, the electrically conductive member 26*a* interposed to electrically connect the electrolysis cells 3, the electrically conductive member 26*b* positioned outermost in the cell stack, and the electrically conductive end member 29 may be formed of an elastic metal or alloy or of a metal fiber or alloy fiber felt to which the necessary surface treatments have been applied.

Additionally, the first end (lower end) and the second end (upper end) of the electrolysis cells 3 are surrounded by the frame 27 of each manifold, and the periphery of the lower end portions and the upper end portions of the electrolysis cells 3 are fixed using the sealing material 39 with which the inside of the frame 27 is filled. In other words, each cell stack 5 is bonded to the frame 27 using the sealing material 39 and houses the plurality of electrolysis cells 3 such that the electrolysis cells 3 are arranged within the frame 27 and are connected via the electrically conductive members 26*a*. Note that the area within the frame 27 is the fixed portion. Additionally, preferably a material having thermal resistance and electrically insulating properties such as, for example, glass or the like, is used as the sealing material 39.

The gas case 31 of the first manifold 54 and the second manifold 57 includes openings for supplying gas to the gas-flow passages 38 of the electrolysis cells 3. A first end portion of the ring-shaped frame 27 is inserted into, and fixed using the sealing material 39, a groove formed in a ring shape so as to surround the openings in the gas case 31. As a result, areas other than the gas-flow passages 38 of the electrolysis cells 3 are hermetically sealed.

In this configuration, the first end portions of the electrolysis cells 3 are fixed to the frame 27 using the sealing material 39 as a separate step prior to connecting the cell stack 5 to the gas case 31. Therefore, the frame 27 can be fixed and sealed to the gas case 31 in a later step.

When operating or producing the electrolysis cell stack device 51, cracking sometimes occurs in the sealing material 39 formed from glass or the like. In cases where, for example, the electrolysis cells 3, the electrically conductive end member 29, the electrically conductive member 26 and other members are fixed using the sealing material 39, this cracking is thought to be caused by the expansion of the members due to heat generated during operation or production. The expanding forces cause stress in the sealing material 39, which leads to cracking. Cracking is particularly prone to occur at the interfaces of the frame 27 and the electrolysis cells 3 with the sealing material 39.

Accordingly, in the electrolysis cell stack device 51 illustrated in FIGS. 8A and 8B, as a means to suppress cracking in the sealing material 39, the second end (upper end) of the electrically conductive end member 29 at a side of the second manifold 57 is separated from the second manifold 57 to reduce the stress generated in the sealing material 39. In other words, the top end of the electrically conductive end member 29 is not fixed in the sealing material 39. Note that in FIG. 8A, these portion are circled with the dot-dash lines.

The propagation of stress generated in the electrically conductive end member 29 to the sealing material 39 can be suppressed and, as a result, cracking in the sealing material 39 can be suppressed. Therefore, a more reliable electrolysis cell stack device 51 can be obtained.

Note that in FIGS. 8A and 8B, an example is illustrated where the second end (upper end) of the electrically conductive end member 29 at the side of the second manifold 57 is separated from the second manifold 57. However, the first end (lower end) of the electrically conductive end member 29 at a side of the first manifold 54 may be separated from the first manifold 54, or the first end (lower end) and the second end (upper end) of the electrically conductive end member 29 may be separated from the first manifold 54 and the second manifold 57. Furthermore, in the electrolysis cell stack device 51 illustrated in FIGS. 8A and 8B, an example is illustrated where the second ends (upper ends) of the electrically conductive end members 29 positioned at both ends in the arrangement direction of the electrolysis cells 3 are separated from the second manifold 57, but a configuration is also possible where only one of the electrically conductive end members 29 is separated.

Regarding this separation of the electrically conductive end member 29 from each of the manifolds, preferably the end of the electrically conductive end member 29 on the side where the greater stress is generated is separated from each of the manifolds. For example, comparing the temperatures on the first manifold 54 side and the second manifold 57 side, more stress is generated and, by extension, more stress is generated in the sealing material, on the side of the electrically conductive end member 29 where the temperature is higher. Thus, in the electrolysis cell stack device 51 having the configuration described above, greater effects can be obtained by separating the first end or the second end of the electrically conductive end member 29 from the manifold (of the first manifold 54 or the second manifold 57) that has a gas having a higher temperature flowing therethrough. Accordingly, the separation of the electrically conductive end member 29 from each of the manifolds may be determined as appropriate on the basis of the temperature of the fluid flowing through the first manifold 54 and the temperature of the fluid flowing through the second manifold 57, or the like.

For example, in a case where the temperature of the gas flowing through the first manifold 54 is higher than the temperature of the gas flowing through the second manifold 57, the first end of the electrically conductive end member 29 at the side of the first manifold 54 is preferably separated from the first manifold 54. More specifically, in a configuration where high-temperature water vapor is introduced into the first manifold 54 and hydrogen-containing gas is collected by the second manifold 57, the temperature of the water vapor will be higher, so the first end (lower end) of the electrically conductive end member 29 can be separated from the first manifold 54.

The amount of separation between the electrically conductive end member 29 and each of the manifolds can be appropriately determined, taking into consideration the effects on hydrogen production efficiency and may, for example, be from 1 to 10 mm. In this case, "distance between the electrically conductive end member 29 and each of the manifolds" means the distance between the surface of the sealing material 39 and the first end of the electrically conductive end member 29.

Additionally, in a case where the temperature of the gas flowing through the second manifold 57 is higher than the temperature of the gas flowing through the first manifold 54, the second end of the electrically conductive end member 29 at the side of the second manifold 57 is preferably separated from the second manifold 57.

Additionally, in the examples illustrated in FIGS. 7 to 8B, the shape of the electrically conductive end member 29 is a flat plate shape, and differs from the shape of the electrically conductive member 26*b*. As a result of this configuration, the electrically conductive end member 29 can draw out electrical current from the electrically conductive member 26*b* across a wide area.

Additionally, the electrically conductive end member 29 preferably is configured such that a first end (lower end) thereof is positioned below the lower end of the electrically conductive member 26*b* and a second end (upper end) thereof is positioned above the upper end of the electrically conductive member 26*b*. As a result of this configuration, the electrically conductive end member 29 will be connected to the electrically conductive member 26*b* across a wide contact area. Accordingly, the electrically conductive end member 29 can draw out electrical current from the electrically conductive member 26*b* across a wide area.

Figure 9A:
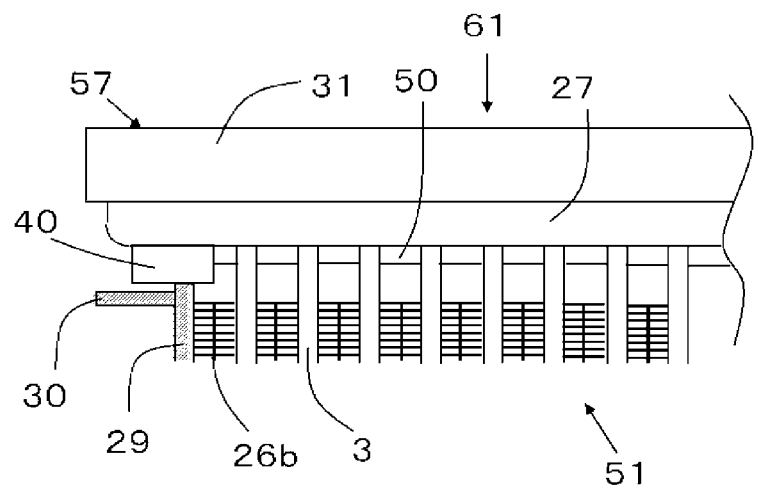
FIGS. 9A and 9B illustrate a part of a second example of the electrolysis cell stack device of the present embodiment.
Figure 9B:
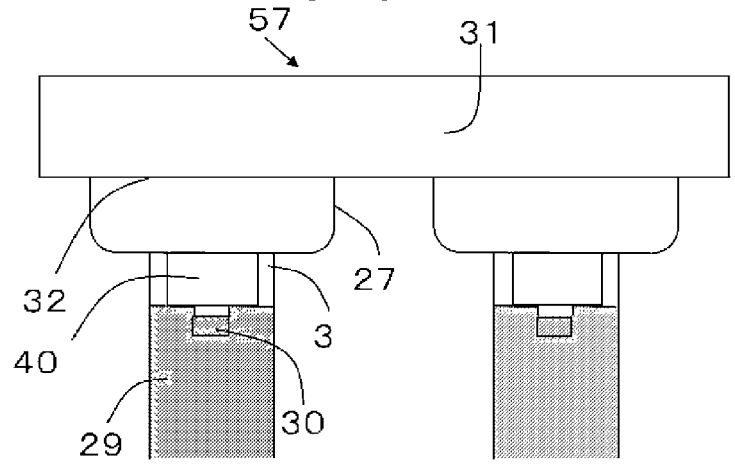

FIGS. 9A and 9B illustrate a part of a second example of the electrolysis cell stack device of the present embodiment. FIG. 9A is a side view and FIG. 9B is a front view.

In the electrolysis cell stack device 51 illustrated in FIG. 8A, the electrically conductive end member 29 is separated from the first manifold 54 and the gap therebetween is depicted as empty space. However, in this case, the electrically conductive end member 29 and the electrically conductive member 26*b* may peel from each other due to the effects of the stress generated in the electrically conductive end member 29 at the site where the electrically conductive end member 29 and the electrically conductive member 26*b* are joined.

Accordingly, in an electrolysis cell stack device 61 illustrated in FIGS. 9A and 9B, a holding member 40 composed of a material different from the sealing material 39 is provided between the second manifold 57 and the second end of the electrically conductive end member 29 at the side of the second manifold 57. The holding member 40 holds the second end (upper end) of the electrically conductive end member 29. More specifically, the holding member 40 is provided between the second end of the electrically conductive end member 29 at the side of the second manifold 57 and the sealing material 39.

Thus, the holding member 40 will absorb part of the stress generated in the electrically conductive end member 29 and peeling of the electrically conductive end member 29 from the electrically conductive member 26*b* can be prevented.

Accordingly, the holding member 40 preferably has elasticity and is deformable; and includes a surface formed from an oxide.

For example, a flocculent thermal insulating material, a helical linear member fabricated using glass or the like, or a plate spring can be used as the holding member 40. Thus, the holding member 40 can absorb more of the stress generated in the electrically conductive end member 29 and also, the holding member 40 can be used stably over a long term, even in high temperature environments where components are prone to oxidization, because the surface of the holding member 40 is formed from an oxide. Note that while only the surface needs to be formed from an oxide, the entire holding member 40 may also be formed from an oxide.

Additionally, as described below, the holding member 40 composed of a material different from the sealing material 39 may be provided between the first manifold 54 and the first end of the electrically conductive end member 29 at the side of the first manifold 54. The holding member 40 holds the first end (lower end) of the electrically conductive end member 29.

Additionally, both the holding member 40 for holding the first end (lower end) and the holding member 40 for holding the second end (upper end) of the electrically conductive end member 29 may be provided.

Additionally, the electrically conductive end member 29 has the electrically conductive portion 30 protruding outward from the cell stack 5, and the electrically conductive portion 30 is preferably electrically conductive because electrical current flows through it out of the cell stack 5. On the other hand, when the holding member 40 is provided and the frame 27 of the manifold 4 is electrically conductive, the holding member 40 preferably has electrically insulating properties because the device may short due to the holding member 40 coming into contact with the frame 27. Shorting caused by the electrically conductive end member 29 or the electrically conductive portion 30 coming into contact with the electrically conductive frame 27 can also be prevented by imparting the holding member 40 with electrically insulating properties.

As such, in this case, the holding member 40 is preferably fabricated using a material such as aluminum oxide, silicon oxide, zirconium oxide, or a composite oxide containing these oxides. Herein, "electrically conductive" refers to properties that pass electricity and "electrically insulating properties" refers to properties that do not pass electricity when the cell stack device is operating.

Additionally, as described above, cracking is also prone to occur at the interface between the sealing material 39 and the electrolysis cells 3. As such, a fixing member 50 including an oxide is preferably provided on the surface of the sealing material 39. The fixing member 50 fixes at least one of the first ends and the second ends of the electrolysis cells 3 to the sealing material 39. This configuration can relax the stress between the electrolysis cells 3 and the sealing material 39. Note that the fixing member 50 is provided in the cell stack device 61 illustrated in FIGS. 9A and 9B. Thus, the fixing member 50 can relax the stress generated by expansion, deformation, or the like of the electrolysis cells 3, and cracking at the interface of the electrolysis cells 3 and the sealing material 39 can be suppressed.

Examples of materials used to fabricate the fixing member 50 include thermal insulating materials having aluminum oxide or silicon oxide as primary components. The reason for using an oxide as the primary component is the same that described above for the holding member.

Figure 10:
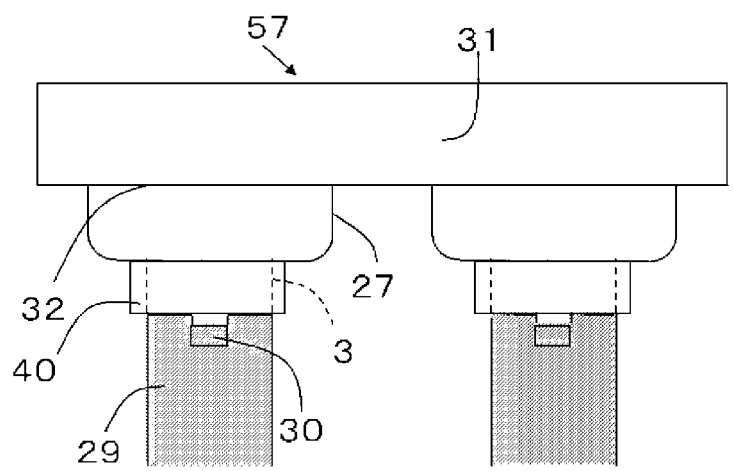
FIG. 10 is a front view illustrating a part of the second example of the electrolysis cell stack device of the present embodiment.

FIG. 10 is a front view illustrating a part of the second example of the electrolysis cell stack device of the present embodiment.

In the example illustrated in FIG. 10, the width of the holding member 40 is greater than the width of the electrically conductive end member 29. With this configuration, the holding member 40 can absorb a part of the stress generated in the electrically conductive end member 29 across a wider contact area. Accordingly, the electrically conductive end member 29 can be prevented from peeling from the electrically conductive member 26b.

Additionally, in the example illustrated in FIG. 10, the width of the holding member 40 is greater than the width of the electrically conductive end member 29 and the holding member 40 is interposed between the electrically conductive end member 29 and the frame 27 so as to be abutted against each. With this configuration, electrically conductive foreign objects can be prevented from being sandwiched between the electrically conductive end member 29 and the frame 27 and, therefore, shorting between the electrically conductive end member 29 and the frame 27 can be prevented.

Figure 11:
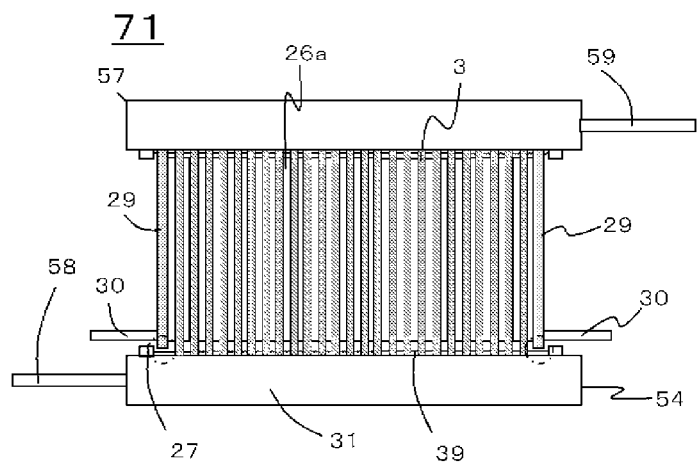
FIG. 11 is a cross-sectional view illustrating the second example of the electrolysis cell stack device of the present embodiment.

FIG. 11 is a cross-sectional view illustrating another example of a fuel cell module according to the present embodiment.

The example differs from the electrolysis cell stack device 51 illustrated in FIGS. 8A and 8B in that the second end of the electrically conductive end member 29 is fixed to the second manifold 57 and the first end of the electrically conductive end member 29 is not fixed to the first manifold 54. Note that in FIG. 11, these separated portions are circled with the dot-dash lines.

In the electrolysis cell stack device 71 illustrated in FIG. 11, the electrically conductive portion 30 for introducing electrical current from an outside source is provided on the lower end portion side of the electrically conductive end member 29. A case is assumed where joule heat is generated at the portion where the electrically conductive end member 29 is connected to the electrically conductive portion 30, and that the temperature of the electrically conductive end member 29 itself rises. In this case, as the electrically conductive end member 29, it is assumed that the temperature of the end portion side, on the side where the electrically conductive portion 30 is provided, is higher.

Accordingly, when separating the end of the electrically conductive end member 29 from each of the manifolds, the end of the side of the electrically conductive end member 29 where the electrically conductive portion 30 is provided can be separated from the manifold.

Thus, in the electrolysis cell stack device 71 illustrated in FIG. 11, the lower end of the electrically conductive end member 29 is separated from the first manifold 54 because the electrically conductive portion 30 is provided on the lower end portion side of the electrically conductive end member 29.

Due to this configuration, the propagation of stress generated in the electrically conductive end member 29 to the sealing material 39 can be suppressed and, as a result, cracking in the sealing material 39 can be suppressed. Therefore, a more reliable electrolysis cell stack device 71 can be obtained.

Additionally, the holding member 40 and the fixing member 50 illustrated in FIGS. 9A to 10 may be applied to the electrolysis cell stack device 71 illustrated in FIG. 11. Specifically, in the electrolysis cell stack device 71 illustrated in FIG. 11, the holding member 40 composed of a material different from the sealing material 39 is provided between the electrically conductive end member 29 and the sealing material 39. The holding member 40 holds the first end (lower end) of the electrically conductive end member 29.

Figure 12:
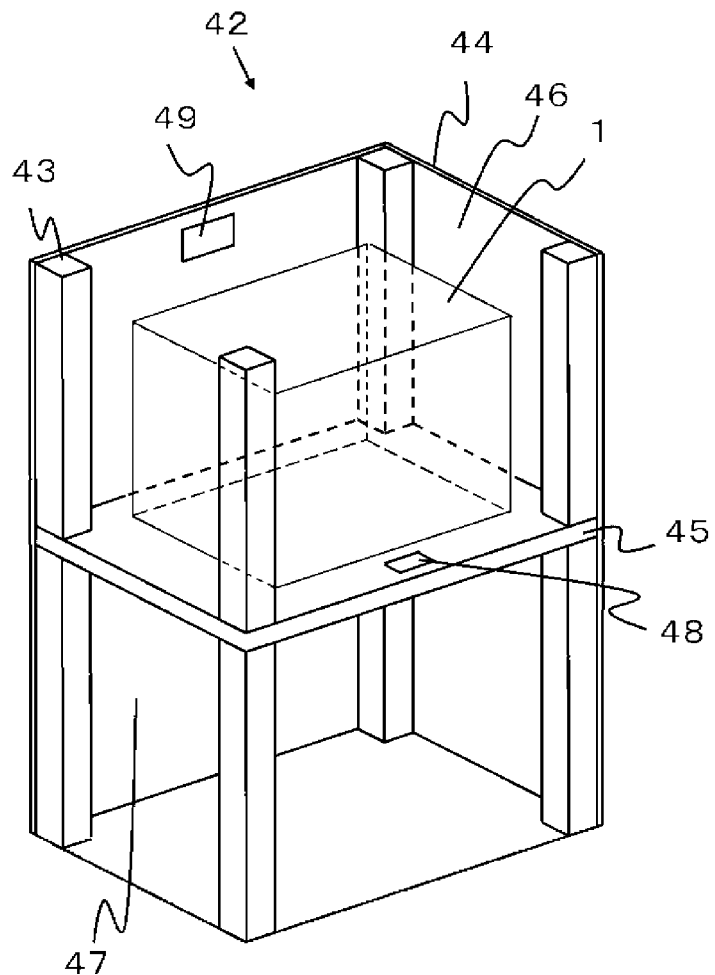
FIG. 12 is an exploded perspective view schematically illustrating an example of a fuel cell device of the present embodiment.

FIG. 12 is an exploded perspective view illustrating an example of a fuel cell device according to the present embodiment in which the fuel cell module 1 illustrated in FIG. 1 and an auxiliary device (not illustrated) configured to operate the fuel cell module 1 are housed in an external casing. Note that some of the components of the configuration are not illustrated in FIG. 12.

In the fuel cell device 42 illustrated in FIG. 12, an outer casing formed of struts 43 and outer plates 44 is divided into an upper and a lower region using a divider 45. The upper region forms a module housing chamber 46 for housing the fuel cell module 1. The lower region forms an auxiliary device housing chamber 47 for housing the auxiliary device configured to operate the fuel cell module 1. Note that the auxiliary device housed in the auxiliary device housing chamber 47 is not illustrated in FIG. 12.

Furthermore, an airflow hole 48 for allowing air in the auxiliary device housing chamber 47 to flow into the module housing chamber 46 is formed in the divider 45, and an exhaust hole 49 for exhausting air out of the module housing chamber 46 is formed in one of the outer plates 44 of the module housing chamber 46.

In this fuel cell device 42, the fuel cell module 1 having improved long-term reliability as described above is housed in the module housing chamber 46, and the auxiliary device configured to operate the fuel cell module 1 is housed in the auxiliary device housing chamber 47. This configuration makes it possible to provide a fuel cell device 42 with improved long-term reliability.

The present invention has been described in detail above. However, the present invention is not limited to the embodiments described above, and various modifications or improvements can be made without departing from the spirit of the present invention.

The examples described above employ so-called vertical cells 3. However, cells referred to commonly as "horizontal cells", in which a plurality of power generating elements or electrolysis elements are formed on a support body may also be used.

Additionally, the examples illustrated in FIGS. 7 to 11 are employed to an electrolysis cell stack device, but a fuel cell stack device may also be used in these examples illustrated in FIGS. 7 to 11. In such a case, for example, the fuel cell stack device is configured so that fuel gas is supplied to the first manifold 54 and expelled gas is recovered by the second manifold 57, and electrical current is drawn from the electrically conductive portion 30.

REFERENCE SIGNS LIST

1 Fuel cell module
2 Housing
3 Fuel cell
4 Manifold
5 Cell stack
12, 41 Fuel cell stack device
26 (26a, 26b) Electrically conductive member
27 Frame
29 Electrically conductive end member
30 Electrically conductive portion
31 Gas case
39 Sealing material
40 Holding member
45 Fuel cell device
50 Fixing member
51, 61, 71 Electrolysis cell stack device
54 First manifold
57 Second manifold

What is claimed is:
1. A cell stack device comprising:
a cell stack comprising a plurality of column-shaped cells extending vertically in a lengthwise direction of the plurality of column-shaped cells and wherein the plurality of column-shaped cells are arranged in a horizontal direction and having an outermost cell of said plurality of column-shaped cells at each end thereof in the horizontal direction;
a first manifold fixing an end in the vertical direction of the cell stack with a first sealing material, and configured to allow a gas to be supplied to the cell stack;
a plurality of first electrically conductive members extending vertically in the lengthwise direction of the plurality of column-shaped cells, which are positioned between the plurality of column-shaped cells and disposed in contact with the plurality of column-shaped cells;
at least one second electrically conductive member extending vertically in the lengthwise direction of the plurality of column-shaped cells, which is disposed in contact with an end side of the outermost cell in the horizontal direction; and
an electrically conductive end member extending vertically in the lengthwise direction of the plurality of column-shaped cells, which is disposed in contact with an outermost end side of the at least one second electrically conductive member in the horizontal direction;
wherein a first end of the electrically conductive end member at a side of the first manifold is separated from the first manifold.
2. The cell stack device according to claim 1, further comprising
a holding member that is:
disposed between the manifold and the first end of the electrically conductive end member;
composed of a material different from the sealing material; and
holding the first end of the electrically conductive end member.
3. The cell stack device according to claim 2,
wherein the holding member is formed from a deformable material and comprises a surface formed from an oxide.
4. The cell stack device according to claim 2,
wherein the holding member has electrically insulating properties.
5. The cell stack device according to claim 1, further comprising:
a fixing member on a surface of the sealing material, fixing the end of the cell at the side of the manifold to the sealing material; and comprising an oxide.
6. The cell stack device according to claim 1, wherein the electrically conductive end member comprises an electrically conductive portion configured to draw electrical current from the cell stack, and
an end of the electrically conductive portion is separated from the manifold.
7. A cell stack device comprising:
a cell stack comprising a plurality of column-shaped cells extending vertically in a lengthwise direction of the plurality of column-shaped cells and wherein the plurality of column-shaped cells are arranged in a horizontal direction and having an outermost cell of said plurality of column-shaped cells at each end thereof in the horizontal direction;
a first manifold fixing a first end in the vertical direction of the cell stack with a first sealing material, and configured to allow a gas to be supplied to the cell stack;
a second manifold fixing a second end in the vertical direction of the cell stack with a second sealing material, and configured to allow a gas expelled from the cell stack to be recovered;
a plurality of first electrically conductive members and at least one second electrically conductive member that both extend vertically in the lengthwise direction of the plurality of column-shaped cells and are arranged between the first end and the second end in the vertical direction of the cell stack, wherein the plurality of first electrically conductive members are positioned between the plurality of column-shaped cells and are disposed in contact with the plurality of column-shaped cells and wherein the at least one second electrically conductive member is disposed in contact with an end side of the outermost cell in the horizontal direction; and an electrically conductive end member extending vertically in the lengthwise direction of the plurality of column-shaped cells, which is disposed in contact with an outermost end side of the at least one second electrically conductive member in the horizontal direction, wherein a first end of the electrically conductive end member corresponding to the first end in the vertical direction of the cell stack at a side of the first manifold is separated from the first manifold, a second end of the electrically conductive end member corresponding to the second end in the vertical direction of the cell stack at a side of the second manifold is separated from the second manifold, or the first end and the second end of the electrically conductive member are separated from the first manifold and the second manifold.

8. The cell stack device according to claim 7, wherein either one of the first manifold and the second manifold where a gas having higher temperature flows, is separated from the first end or the second end of the electrically conductive end member facing the manifold.

9. The cell stack device according to claim 7, further comprising:

a holding member holding at least one of the first end and the second end of the electrically conductive end member; wherein the holding member is disposed at least one of locations between the first manifold and the first end of the electrically conductive end member and between the second manifold and the second end of the electrically conductive end member; and the holding member is formed from a material different from the first and/or second sealing material, respectively.

10. The cell stack device according to claim 7, further comprising:

a fixing member on a surface of the first and/or second sealing material, respectively, fixing at least one of the first end and the second end of the cell to the sealing material and comprising an oxide.

11. The cell stack device according to claim 9, wherein the holding member is formed from a deformable material and comprises a surface formed from an oxide.

12. The cell stack device according to claim 9, wherein the holding member has electrically insulating properties.

13. The cell stack device according to claim 7, wherein: the electrically conductive end member comprises an electrically conductive portion configured to introduce electrical current from an external source or to draw electrical current out of the cell stack, and an end of the electrically conductive portion is separated from the first manifold and the second manifold.

14. A module comprising:
a housing; and
the cell stack device according to claim 1 housed in the housing.

15. A module-containing device comprising:
an external case;
the module according to claim 14 housed in the external case; and
an auxiliary device configured to operate the module housed in the external case.

16. The cell stack device of claim 1, wherein:
the electrically conductive members are connected to each cell of the plurality of column-shaped cells; and
a contact face of the electrically conductive end member is wider than a contact face of the electrically conductive member.

17. The cell stack device of claim 7, wherein:
the electrically conductive members are connected to each cell of the plurality of column-shaped cells; and
a contact face of the electrically conductive end member is wider than a contact face of the electrically conductive member.

18. A cell stack device comprising:
a cell stack comprising a plurality of column-shaped cells arranged substantially parallel in a horizontal direction and having an outermost cell of the plurality of column-shaped cells at each end thereof;
a first manifold fixing an end of the cell stack with a sealing material, and configured to allow a reaction gas to be supplied to the each cell;
first electrically conductive members disposed along and between a lengthwise direction of the plurality of column-shaped cells in the cell stack that are substantially parallel to the plurality of column-shaped cells of the cell stack; and
an electrically conductive end member having a flat plate shape disposed outward of one of the outermost cells at an end portion of the cell stack in the horizontal direction, extending vertically in the lengthwise direction of the plurality of column-shaped cells in the cell stack, and arranged substantially parallel to the plurality of column-shaped cells of the cell stack;
wherein the electrically conductive end member at a side of the first manifold is separated by a gap from any part of the first manifold.

19. The cell stack device of claim 18,
wherein a holding member is disposed in the gap between the first manifold and the electrically conductive end member and elastically supports the electrically conductive end member.

20. The cell stack device of claim 18, further comprising:
at least one second electrically conductive member disposed along and between the lengthwise direction of the one of the outermost cells and the electrically conductive end member that is substantially parallel to the plurality of column-shaped cells of the cell stack, wherein the electrically conductive member extends beyond an upper end and a lower end of the at least one second electrically conductive member.

* * * * *